United States Patent [19]

Dietzel et al.

[11] 4,058,410
[45] Nov. 15, 1977

[54] COUNTER-CURRENT LEACHING TOWER

[75] Inventors: Walter Dietzel; Siegfried Matusch, both of Braunschweig, Germany

[73] Assignee: Braunschweigische Maschinenbauanstalt, Braunschweig, Germany

[21] Appl. No.: 772,259

[22] Filed: Feb. 25, 1977

[30] Foreign Application Priority Data

Mar. 9, 1976 Germany .............................. 2609673

[51] Int. Cl.² .............................................. C13D 1/12
[52] U.S. Cl. .................................... 127/5; 23/267 R; 23/267 C; 23/270 R; 127/3
[58] Field of Search ........................................ 127/2-7; 23/270 R, 267 R, 267 C, 270.5

[56] References Cited

U.S. PATENT DOCUMENTS

| 3,953,224 | 4/1976 | Dietzel | 127/5 |
| 3,961,904 | 6/1976 | Bennett | 23/273 R |

Primary Examiner—Sidney Marantz
Attorney, Agent, or Firm—W. G. Fasse; W. W. Roberts

[57] ABSTRACT

A counter-current leaching or extraction tower for comminuted vegetable matter such as sugar beet cossettes, or crushed sugar cane, is provided with conveying elements, the longitudinal dimension of which may be altered in response to the operating condition in the material or matter being leached. Especially, the baffle members in the tower and, if desired, also the conveyor screw wings which are arranged to cooperate with the baffle members, are adjustable in their length in response to control signals derived from sensors, such as strain gauges, attached to the conveying elements. The angular position of the conveying elements in a plane parallel to the motion of the screw wings and relative to a radial direction may also be adjustable in response to the same type of control signals. The conveying elements may be constructed to include telescoping members which are longitudinally and thus radially extendable and retractable relative to the volume of the extraction tower. The combination of the several adjustabilities of the conveying elements provides an efficient localized control of the operating conditions throughout the tower volume.

7 Claims, 7 Drawing Figures

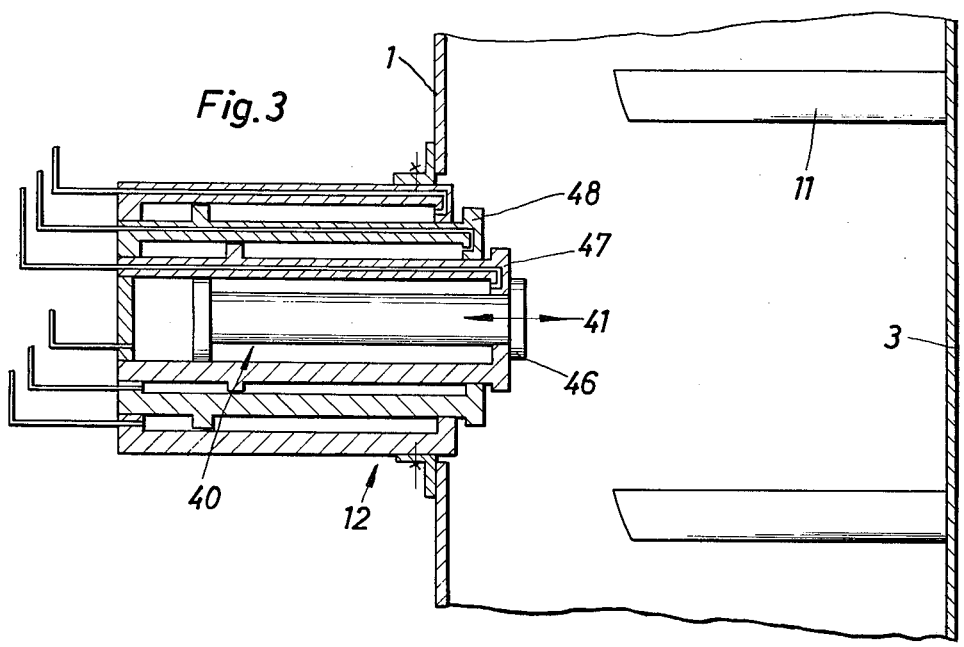
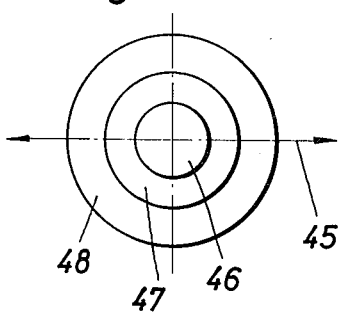
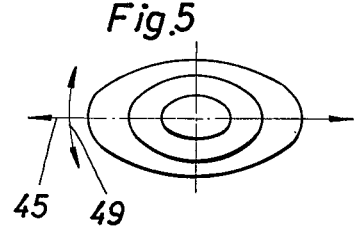
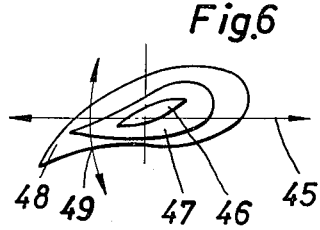
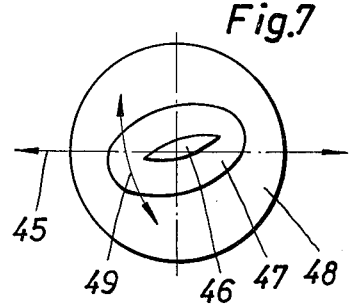

COUNTER-CURRENT LEACHING TOWER

CROSS REFERENCE TO RELATED PATENTS

The present invention is related to our previous U.S. Pat. No. 3,953,224, issued on Apr. 27, 1976 for "Extraction Tower For Sugar Beet Cossettes Or Crushed Sugar Cane."

BACKGROUND OF THE INVENTION

The invention relates to an extraction tower for the counter-current leaching of comminuted vegetable matter, such as sugar beet cossettes, or crushed sugar cane. As disclosed in our above mentioned earlier U.S. Patent, such towers include a housing and a central shaft rotatably supported in the housing. The conveying means for moving the comminuted vegetable matter axially from the bottom to the top of the tower include a central drive shaft having secured thereto conveying wings providing a screw type transport action. The conveying means further include baffle elements secured to the inner wall of the tower housing. As disclosed in our earlier patent, the baffle conveying elements and/or the wing type conveying elements may be rotatable about their longitudinal axis, at least through a certain angular range. The conveying baffle elements project into the spaces between adjacent wings of the conveyor shaft, whereby the wings and the baffles cooperate in conveying the material upwardly through the tower against the downwardly flowing extraction liquid.

As disclosed in our above mentioned patent, at least some of the conveying elements are provided with pressure or bending responsive sensors, such as strain gauges or the like, generating a respective control signal which is used for changing the composition and/or quantity of the supplied material as it is conveyed through the tower. This control is accomplished by adjusting the angular position of any one of the conveying elements and/or for regulating the drive motor of the central conveying shaft.

The teaching disclosed in our above mentioned U.S. Pat. No. 3,953,224 is based on the recognition that the load which is measured at any member participating in the conveying, permits a conclusion with regard to the consistency of the materials being conveyed at the point of measurement. This conclusion may be made regardless where the measuring takes place in the tower, for example, at a stop member, a baffle plate, a wing, and/or a worm turn or screw turn of the central conveying shaft, because the load responsive sensor or pick-up which may respond to pressure or bending, provides a signal which will be larger when the material being conveyed is densely packed and the signal will be smaller when the material is not so densely packed.

The ever increasing dimensions of extraction towers involve a substantial number of technological advantages. However, at the same time the distribution of the vegetable matter, as it is moved through the tower, may not necessarily be homogeneous throughout the tower volume, especially the larger the tower volume gets. Thus, it is not possible to assure with the necessary certainty, that the vegetable matter is uniformly distributed as it is being moved through the tower. However, for an effective leaching, it is desirable, that the ratio between vegetable matter such as sugar beet cossettes and the leaching liquid is the same throughout the volume of the tower, whereby this ratio should correspond to the technologically predetermined value which assures a most efficient leaching operation.

According to the disclosure of our above mentioned U.S. Pat. No. 3,953,224, it is possible to influence inhomogeneities occurring locally in the volume of the tower in the material passing through the tower, by adjusting the pitch angle of the guide baffles or of the wings of the conveying screws. The adjustment involves a rotational movement about the longitudinal axis of the wing or baffle and through a determined angle range. The patent also provides for controlling the quantity of material being supplied into the tower, as well as the quantity of the leaching liquid supplied into the tower. Further, our prior patent teaches to control the rotational speed of the drive shaft for the conveying screw or worm. The just described adjustments in our prior patent are performed in response to the measured values which are supplied by the pick-up or sensor to the control apparatus which in turn transforms the measured values into suitable control signals, for example, by amplification for driving a servosystem.

OBJECTS OF THE INVENTION

In view of the above, it is the aim of the invention to achieve the following objects, singly or in combination:

to provide an extraction tower of the type described in out prior patent in which the control of inhomogenities in the material being conveyed throughout the tower volume is further improved, specifically, the ratio between the material being leached and the leaching liquid should be uniform throughout the tower volume;

to control the material distribution throughout the tower volume with a sensitivity and precision as well as within a large range not previously possible;

to provide an extraction tower with variable length conveying means, whereby the baffle elements and/or the screw elements of the conveyor screw may be varied in their effective length reaching into the tower volume and/or their angular position;

to adjust the angular position of the conveying elements in the path or plane of motion of the screw wings, whereby the baffle plates may extend in the direction of rotation of said conveyor screw or against the direction of rotation of the conveyor screw to move material toward the wings of the conveyor screw or away from the conveyor screw toward the outer tower housing wall;

to employ telescoping baffle elements and/or telescoping screw wings which also may have differing cross sectional shapes, whereby the members of a group of conveying elements may have different cross sectional shapes; and to combine various types of controls in a single tower whereby, for example, the pitch angle and/or the angle relative to the radial direction of the screw wings may also be adjustable.

SUMMARY OF THE INVENTION

According to the invention there is provided an extraction tower for conveying materials through a leaching path in counter-current fashion relative to a leaching liquid flow, comprising a tower housing, a plurality of material conveying means including rotatable screw means and baffle means operatively arranged inside said tower for conveying said material through the tower housing, sensor means operatively secured to any of said material conveying means to sense loads to which the respective conveying means are subjected in operation inside said tower, control means responsive to said sensor means, drive means individually connected to said material conveying means, means connecting at least certain of said drive means to said control means for regulating said drive means in response to load signals received from said sensor means, and length varying means as part of said conveying means, said drive means including means operatively connected to said length varying means for varying the effective length of at least certain of said conveying means.

According to a further embodiment of the invention, at least certain of the conveying means, such as the wings of the screw means, and/or the baffle means may be adjustable in their angular position relative to a radial direction, whereby the baffle plates may be tilted in a plane extending in parallel to the path of movement of the screw wings.

According to a preferred embodiment of the invention, the effective length of the conveying means may be varied in at least certain of the baffle means and/or wings by arranging a plurality of such means in telescoping fashion relative to each, whereby the conveying means may have different diameters and/or different cross sectional shapes so that depending on the control signal, the conveying means of suitable size and/or cross sectional shape is moved into the volume of the tower for adjusting the material distribution.

According to the invention, it is further intended to combine conveying means of different types in one group so that, for example, a baffle arrangement may include a baffle member of circular cross sectional shape and/or a baffle member of oval cross sectional shape as well as a baffle member having a wing type cross sectional shape, whereby depending on the control signal from the control apparatus, baffle plates or wing type elements may be extended into the volume of the tower.

BRIEF FIGURE DESCRIPTION

In order that the invention may be clearly understood, it will now be described, by way of example, with reference to the accompanying drawings, wherein:

FIG. 3 illustrates a sectional view similar to that of FIG. 1, however, showing a group of baffle members arranged telescopically relative to each other;

FIG. 4 illustrates schematically a view of several telescopically arranged baffle members, each having a circular cross section;

FIG. 5 is a view similar to FIG. 4, but showing telescopically arranged conveying means having an oval cross sectional shape;

FIG. 6 is a view similar to FIGS. 4 and 5, however, illustrating the telescopic arrangement of a plurality of conveying elements having a wing shaped cross section; and FIG. 7 illustrates the telescoping combination of conveying elements each having a different cross sectional shape.

DETAILED DESCRIPTION OF PREFERRED EXAMPLE EMBODIMENTS

With regard to the structural details of the extraction tower, and the control, as well as sensor means, the disclosure of our prior U.S. Pat. No. 3,953,224 is hereby incorporated by a reference into the present disclosure. The same structural elements have the same reference numbers in our earlier patent and in the present disclosure.

The figures illustrate an extraction tower for the counter-current leaching of, for example, sugar beet cossettes. The tower comprises a cylindrical housing 1 inside of which there are arranged the material conveying means including a central shaft 3 which is driven to rotate as described in our previous above mentioned patent. The central shaft 3 is provided with screw wings 11 which are secured to the shaft at different levels in a staggered, helically displaced relationship in the axial direction so that each wings or plate registers with the spacing therebelow. The sugar beet cossettes are conveyed upwardly through the tower as the shaft 3 rotates.

Baffle means 12 are secured to the outer housing wall for cooperation with the wings 11. As illustrated in FIGS. 4, 5 and 6, the wings 11 and/or the baffle means 12 may have a circular, an oval, or an elliptical or wing type cross sectional shape.

In order to control the material transport as well as the homogeneity of the material distribution throughout the volume of the tower by way of the baffle means 12, especially where the extraction tower has a large diameter and where it is intended to vary the control in a wide range and in a finely graduated manner, the baffle means 12 are adjustable in their position in several ways as will now be described.

Figure 1:
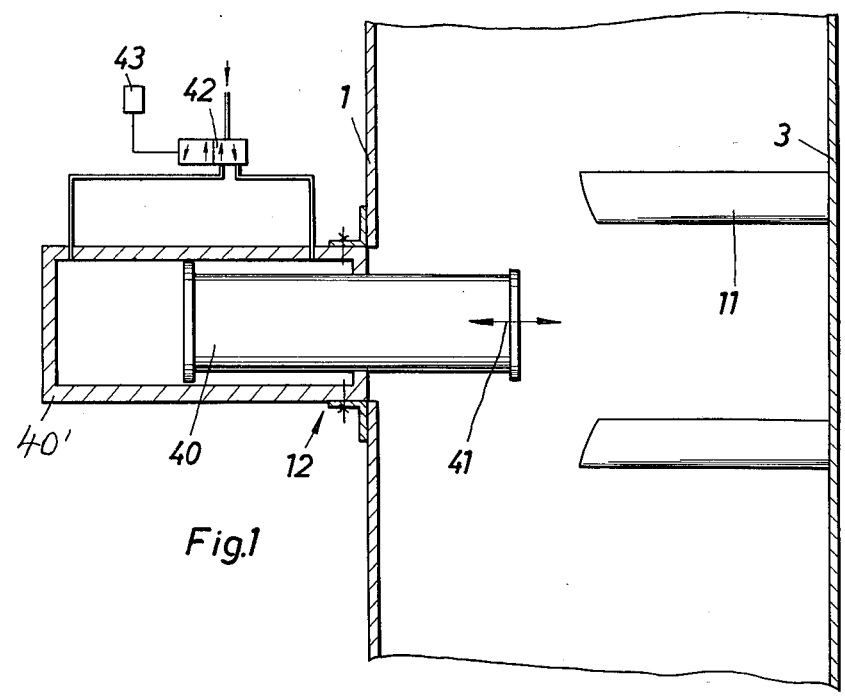
FIG. 1 illustrates in a somewhat schematic manner, a sectional view through a portion of an extraction tower, whereby the section extends along the longitudinal axis of the tower and through the longitudinal axis of a baffle conveyor means which is adjustable in its effective length.

In the embodiment of FIG. 1, the baffle means comprise a piston 40 slidable back and forth as indicated by the arrow 41 in a cylinder 40'. Inside the cylinder 45, the piston 40 is provided with an enlarged end member so that the piston may be subjected to pressure on one or the other side of the end member by means of a control valve 42 which may be operated by a magnet 43, which in turn is connected for energization to one of the outputs of the control device 32 in our above mentioned prior patent. By extending the piston 40 more or less into the space inside the tower, it is possible to increase or decrease the effective length of the baffle means which the piston constitutes to thereby control the material halting or retarding effect in a finely graduated manner. Incidentally, the control device 32 comprises an amplifier circuit and comparators or discriminators as well as a memory providing a reference value as described in our above mentioned patent.

Figure 2:
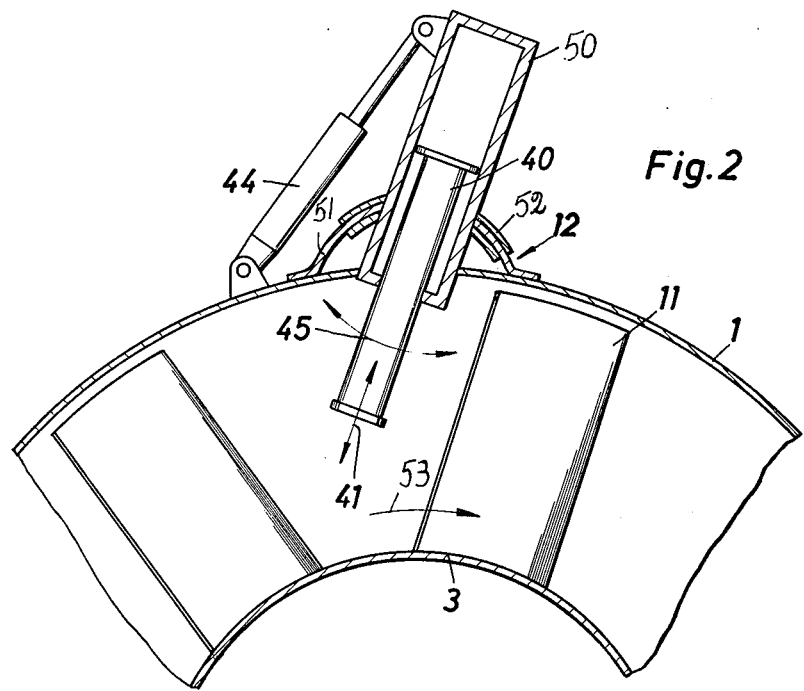
FIG. 2 shows a partial section in a plane extending perpendicularly to the longitudinal tower axis, thereby illustrating a modification in which the conveyor baffle means may be adjusted in its effective length, as well as in its angular position relative to the radial extension of the screw wings.

In FIG. 2 the embodiment provides for two adjustments, namely back and forth into the space of the tower 1 as indicated by the arrow 41 and a tilting adjustment as indicated by the arrow 45. The tilting adjustment is accomplished by supporting the cylinder housing 50 on a curved guide rod 51 attached to the tower housing 1. A guide channel 52 secured to the outside of the cylinder housing 50 is similarly curved as the guide rod 51 to receive the latter so that the entire cylinder housing 50 may be moved back and forth in a plane extending in parallel to the travel path of the wings 11, said movement being accomplished by a pneumatic or hydraulic piston cylinder arrangement 44. This feature of the invention has the advantage that the piston 40 which forms the baffle means may be placed into positions extending somewhat in the direction of rotation of the wings 11 as indicated by the arrow 53. In the alternative, the piston 40 may be directed somewhat against the direction of rotation as illustrated in FIG. 2. Depending on the range of the adjustability of the guide means 51, 52 the piston 40 may even extend substantially tangentially relative to the direction of rotation of the shaft 3. Depending on the position of the baffle cylinder 40, material may be shifted toward the screw shaft 3 or away from the screw shaft 3 toward the outer wall of the housing 1.

In the embodiment of FIG. 3 the baffle means 12 comprise several coaxially arranged baffle elements or baffle members 46, 47, and 48. These baffle members have different diameters and are coaxially arranged in a telescoping manner with the baffle member 46 of the smallest diameter located centrally in the baffle member 47 of the next larger diameter, which in turn is located in the baffle member 48 of still larger diameter. The just described arrangement is such that the baffle members 47 and 48 function simultaneously as pistons and as cylinders 40 for operating the respective inner member. Thus, it is possible to extend each of the members 46, 47, 48 individually independently of the other baffle members back and forth in the direction of the arrow 41. For example, the baffle 46 alone could be extended or the baffle 47 alone could be extended to some extent until it entrains the baffle member 46. Similarly, the baffle member 48 can be extended, and it too could take along the baffle member 47. In the alternative, the individual baffle members may be extended in steps to different depths.

The above mentioned individual cross sectional shapes of the baffle members and/or of the wing members are illustrated in FIGS. 4, 5, and 6, may be employed in combination as illustrated in FIG. 7, showing an example wherein a circular cross sectional member 48 surrounds an oval cross sectional member 47 which in turn surrounds a wing shaped member 46.

In addition to the above described axial adjustment indicated by the arrow 41 and the horizontal adjustment indicated by the arrow 49, there may be combined in the present apparatus the type of adjustment disclosed in our above mentioned prior patent. Such adjustment about the longitudinal axis is indicated by the arrow 49, for example in FIGS. 5, 6, and 7. Of course, such rotational adjustment about the longitudinal axis as indicated by the arrow 49 would not be employed where the conveying means have a circular cross sectional shape. However, where the conveying means have a non-circular sectional shape the material control effect is further improved where the various possible adjustments disclosed herein are combined with the rotational adjustments disclosed in our above patent.

Incidentally, the telescoping means illustrated in FIG. 3 may also be arranged for a swivel adjustment just as has been described above with reference to FIG. 2. In addition, if in FIG. 3 the individual members have a non-circular cross sectional shape, their pitch angle may also be adjusted as indicated by the arrow 49.

Although in the above description the piston cylinder arrangement 40 and 44 may be operated in a hydraulic or pneumatic manner, it will be appreciated, that other adjustment means may be employed, for example, a spindle and screw drive or a worm gear and the like.

Although the adjustability of the wings 11 has not been illustrated in detail, it will be appreciated that these wings may be adjusted in the same manner as has been illustrated, for simplicity's sake, with regard to the baffle members.

In the light of the above disclosure the following advantages of the invention should be emphasized. The combination of features, according to the invention, which features may be applied individually or in various combinations, permit a very fine control of the conveyance of the vegetable matter through the tower, particularly the cossette mass may be influenced at any desired location within the tower as the cossettes are moved through the tower. Especially the adjustment of the baffle means which are extenable and retractable relative to the center of the tower and the length of which can be adjusted from the tower wall toward the rotational axis of the tower, makes it possible to confine the stopping effect of the baffle means to any desired location within the tower, especially those cross sectional areas where the advancing material column requires a differentiated stopping effect.

The described swiveling adjustment of the extendable and rectractable baffle members makes it possible to set the position of the baffle members so that the ends thereof point toward the central screen shaft, or in the direction of rotation, or in a direction substantially opposite to the direction of rotation of the central screw shaft. Thus, it is possible, depending on the adjusted angle between the longitudinal axis of a baffle member and the radial direction relative to the rotational axis of the tower, that a baffle member directs cossettes away from the central shaft toward the outer wall or that the baffle member directs cossettes toward the central screw shaft. As shown in FIG. 2, the angular adjustment and the longitudinal adjustment of the baffle means may be combined so that one and the same baffle member is adjustable in both ways, whereby again the effects of the two adjustments may be conveniently confined to that cross sectional area of the tower where the adjustment is needed.

The embodiment illustrated in FIG. 3, which incidentally may be combined with the angular adjustment of FIG. 2, provides a further variation in the adjustability of the size of the stopping effect of the baffle members which effect may be varied substantially continuously in a very sensitive manner by means of the telescoping baffle members arranged coaxially relative to each other, whereby not only very thin, but also very thick baffle members may be extended into the tower volume or withdrawn from the tower volume. This type of adjustment may be further modified by differently extending or retracting the different types of telescoping baffle members, whereby an adjustment of the stopping effect is even possible radially relative to the rotational axis of the tower.

The above mentioned third possibility of adjustment as disclosed in our prior patent may also be combined in an arrangement such as shown in FIG. 3, whereby the same group of baffle members may be adjusted in the direction of any one of the arrows 41, 45, and 49. In this context the most versatile adjustment would be achieved by an embodiment as illustrated in FIG. 7 where baffle members of different cross sectional configurations are combined to form a group. In this manner it is possible to avoid localized inhomogeneities by suitable adjustments which are locally effective and which are selected in response to the particular situation at any individual location within the volume of the tower.

In the light of the above disclosure, it will be appreciated that the described adjustment may also be applied to the wings 11, without departing from the present teaching. Thus, although the invention has been described with reference to specific example embodiments, it will be appreciated, that it is intended to cover all modifications and equivalents within the scope of the appended claims.

What is claimed is:

1. An extraction tower for conveying material through a leaching path in counter-current fashion relative to a leaching liquid flow, comprising a tower housing, a plurality of material conveying means including rotatable screw means and baffle means operatively arranged inside said tower for conveying said material through the tower housing, sensor means operatively secured to any of said material conveying means to sense loads to which the respective conveying means are subjected in operation inside said tower, control means responsive to said sensor means, drive means individually connected to said material conveying means, means connecting at least certain of said drive means to said control means for regulating said drive means in response to load signals received from said sensor means, and length varying means as part of said conveying means, said drive means including means operatively connected to said length varying means for varying the effective length of at least certain of said conveying means.

2. The extraction tower of claim 1, further comprising adjustable support means operatively supporting any one of said material conveying means, further drive means connected to any one of said conveying means for changing the angular position of the respective conveying means substantially in a plane parallel to the path of motion of certain of said conveying means, said further drive means being responsive to said control means for varying said angular position of the respective conveying means.

3. The extraction tower of claim 1, wherein said length varying means of said conveying means comprise telescoping conveying elements arranged in groups, said length varying drive means being connected to said conveying elements and responsive to said control means for adjusting any one of said conveying elements axially relative to other elements in a group.

4. The extraction tower of claim 3, wherein said telescoping conveying elements have a circular cross section.

5. The extraction tower of claim 3, wherein said telescoping conveying elements have an oval cross section.

6. The extraction tower of claim 3, wherein said telescoping conveying elements have a wing shaped cross section.

7. The extraction tower of claim 3, wherein said telescoping conveying elements in a group comprise a combination of elements having different cross sectional shapes.

* * * * *